(12) United States Patent
Geshi et al.

(10) Patent No.: US 9,768,425 B2
(45) Date of Patent: Sep. 19, 2017

(54) BATTERY MODULE (71) Applicant: Panasonic Intellectual Property Management Co., Ltd., Osaka (JP)

(72) Inventors: Shinya Geshi, Osaka (JP); Oose Okutani, Hyogo (JP); Hiroshi Takasaki, Osaka (JP); Katsuji Tsujioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 13 days.

(21) Appl. No.: 14/908,801

(22) PCT Filed: Oct. 29, 2014

(86) PCT No.: PCT/JP2014/005473
§ 371 (c)(1),
(2) Date: Jan. 29, 2016

(87) PCT Pub. No.: WO2015/064097
PCT Pub. Date: May 7, 2015

(65) Prior Publication Data
US 2016/0181579 A1 Jun. 23, 2016

(30) Foreign Application Priority Data
Oct. 31, 2013 (JP) .................. 2013-226796

(51) Int. Cl.
*H01M 2/00* (2006.01)
*H01M 2/10* (2006.01)
(Continued)

(52) U.S. Cl.
CPC ......... *H01M 2/105* (2013.01); *H01M 2/1077* (2013.01); *H01M 2/206* (2013.01);
(Continued)

(58) Field of Classification Search
CPC ...... H01M 2/105; H01M 2/1077; H01M 2/26; H01M 2/263; H01M 2/348
See application file for complete search history.

(56) References Cited

U.S. PATENT DOCUMENTS 3,682,705 A * 8/1972 Petix ............... H01M 2/208
429/463
2011/0171515 A1* 7/2011 Itoi .................. H01M 2/105
429/159
(Continued)

FOREIGN PATENT DOCUMENTS

JP 2010-282811 12/2010
JP 2011-253641 12/2011
(Continued)

OTHER PUBLICATIONS

International Search Report of PCT application No. PCT/JP2014/005473 dated Jan. 6, 2015.

*Primary Examiner* — Milton I Cano
*Assistant Examiner* — Jimmy K Vo
(74) *Attorney, Agent, or Firm* — McDermott Will & Emery LLP (57) ABSTRACT

A battery module includes: a plurality of battery cells held in a case; and a collector plate disposed on one side or the other side of the plurality of battery cells. The collector plate includes connection terminals connected to a collector plate main body so that the plurality of connection terminals are disposed to face an electrode provided in each of the battery cells. In at least one of the electrodes, the plurality of the connection terminals facing the at least one electrode include a first connection terminal welded to the electrode and a second connection terminal not welded to the electrode.

4 Claims, 9 Drawing Sheets

(51) Int. Cl.
*H01M 2/34* (2006.01)
*H01M 2/20* (2006.01)
*H01M 2/26* (2006.01)

(52) U.S. Cl.
CPC ............ *H01M 2/26* (2013.01); *H01M 2/348* (2013.01); *H01M 2/263* (2013.01); *H01M 2200/103* (2013.01)

(56) References Cited

U.S. PATENT DOCUMENTS

2011/0293998 A1 12/2011 Sato et al.
2013/0202941 A1 8/2013 Ono et al.
2013/0230761 A1 9/2013 Okutani et al.

FOREIGN PATENT DOCUMENTS

| | | |
|---|---|---|
| JP | 2013-030382 | 2/2013 |
| JP | 2013-134828 | 7/2013 |
| JP | 2013-196907 | 9/2013 |
| WO | 2012/073399 | 6/2012 |
| WO | 2012/164832 | 12/2012 |

* cited by examiner

BATTERY MODULE

CROSS-REFERENCE TO RELATED APPLICATIONS

This application is a U.S. national stage application of the PCT International Application No. PCT/JP2014/005473 filed on Oct. 29, 2014, which claims the benefit of foreign priority of Japanese patent application 2013-226796 filed on Oct. 31, 2013, the contents all of which are incorporated herein by reference.

TECHNICAL FIELD

The present disclosure relates to a battery module including a plurality of battery cells held in a case, and a collector plate.

BACKGROUND ART

Conventionally, electrodes provided to ends of a plurality of battery cells and collector plates are connected by connection terminals provided to the collector plates. In this case, the connection terminals and the electrodes are connected by resistance welding, for example.

Described in Patent Literature 1 is a battery module in which a plurality of collector plates are disposed on opposite end sides of a plurality of battery cells and the respective collector plates and electrodes provided to ends of the plurality of battery cells are connected by wire bonding using wires as a plurality of connection terminals.

CITATION LIST

Patent Literature

PTL 1: Unexamined Japanese Patent Publication No. 2010-282811

SUMMARY OF THE INVENTION

When the connection terminals are welded to the plurality of electrodes, welding failures (welding errors) may occur due to some cause such as contamination of foreign matters. In this case, a yield rate of a product including collector plates used for the welding reduces. As a result, a manufacturing cost of the battery module increases.

It is an object of the present disclosure to provide a battery module and a method of manufacturing the battery module, with which it is possible to suppress reduction in a yield rate of a product, even when welding failures between electrodes and connection terminals occur.

According to an aspect of the present disclosure, there is provided a battery module including: a plurality of battery cells held in a case; and a collector plate disposed on one side or the other side of the plurality of battery cells. The collector plate includes connection terminals connected to a collector plate main body so that the plurality of connection terminals are disposed to face an electrode provided in each of the battery cells. In at least one of the electrodes, the plurality of connection terminals facing the at least one electrode include a first connection terminal welded to the electrode and a second connection terminal not welded to the electrode.

According to an aspect of the present disclosure, there is provided a method of manufacturing a battery module including a plurality of battery cells held in a case and a collector plate disposed on one side or the other side of the plurality of battery cells. The collector plate includes connection terminals having a first connection terminal and a second connection terminal and connected to a collector plate main body so that the plurality of connection terminals are disposed to face an electrode provided in each of the battery cells. The method of manufacturing the battery module includes a main welding step of carrying out a welding operation for welding only the first connection terminal in the plurality of connection terminals facing each of the electrodes to the electrode and not welding the second connection terminal facing the electrode to the electrode.

According to the battery module and the method of manufacturing the battery module according to the aspects of the present disclosure, it is possible to suppress reduction in a yield rate of a product even when welding failures between electrodes and connection terminals occur.

DESCRIPTION OF EMBODIMENT

An exemplary embodiment according to the present disclosure will be described below in detail with reference to the drawings. In the description, specific shapes, materials, numerical values, and directions are examples for allowing the present disclosure to be easily understood, and can be appropriately changed in accordance with applications, purposes, or specifications. When a plurality of exemplary embodiments or modified examples are included in the following description, the present invention can be carried out by appropriately or arbitrarily combining respective component elements in the plurality of exemplary embodiments or modified examples. In the following description, substantially the same elements may be provided with the same reference marks in all the drawings and described in some cases.

Figure 1:
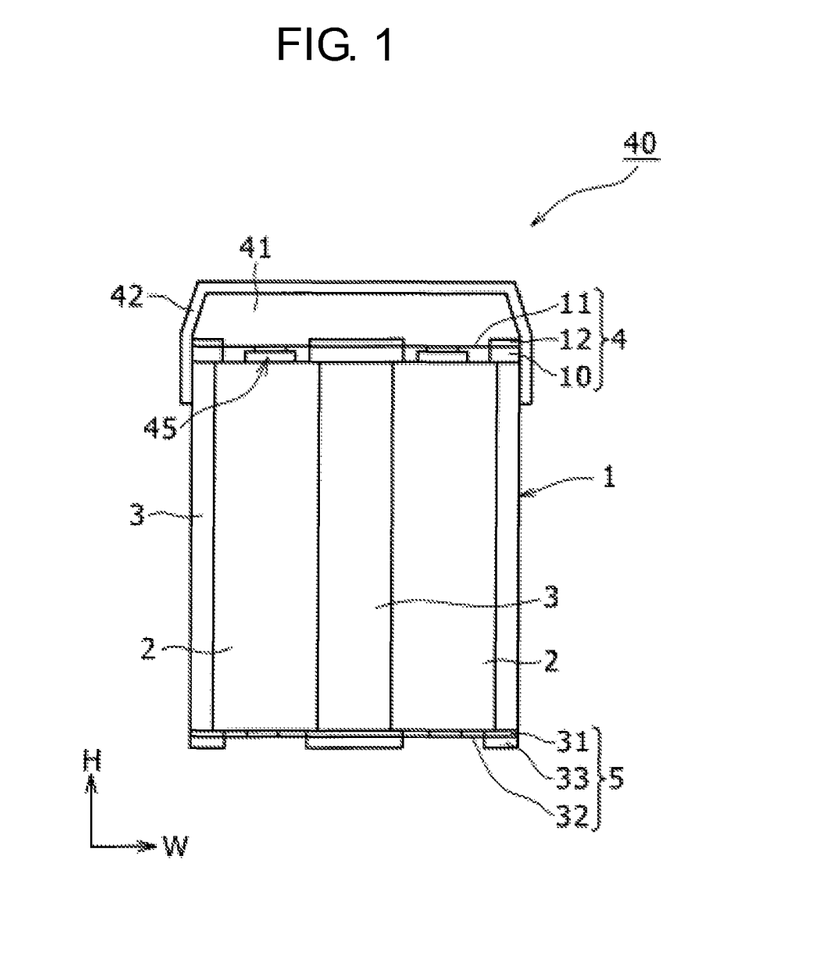
FIG. 1 is a sectional view of a battery module in an exemplary embodiment of the present disclosure.
Figure 2:
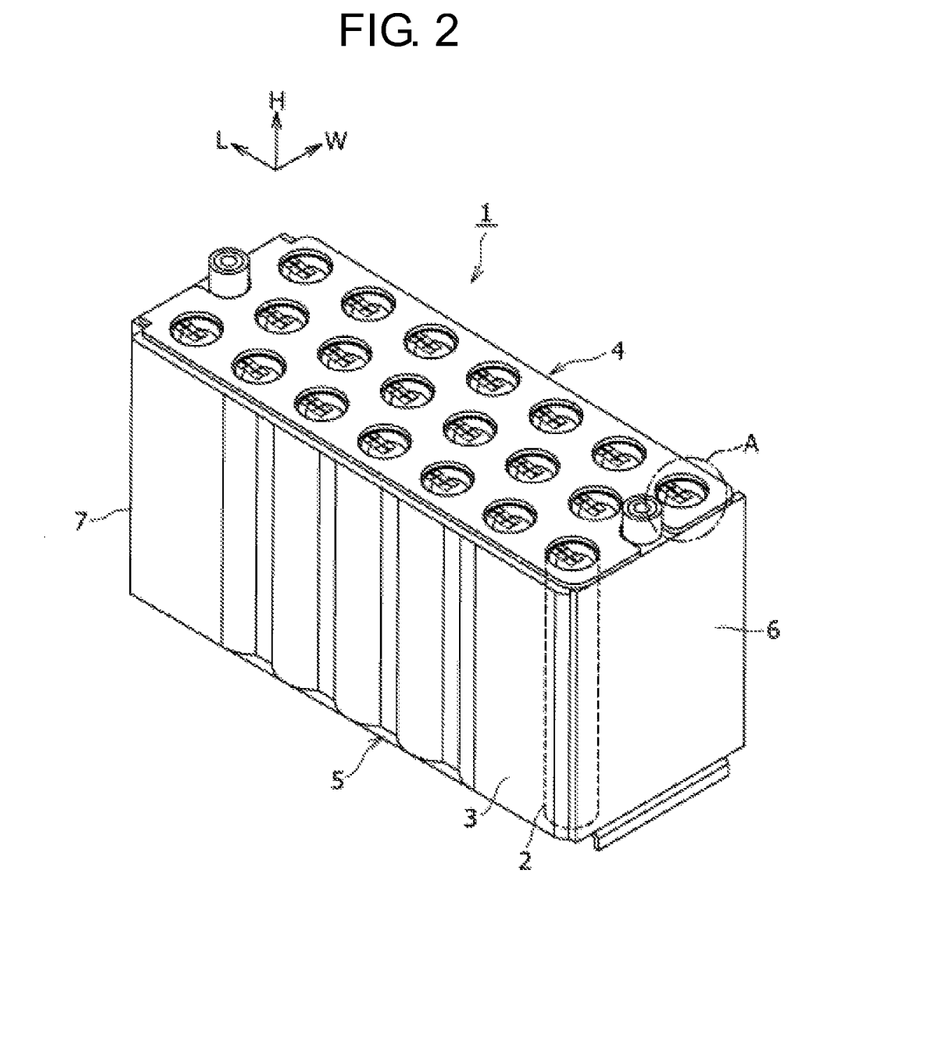
FIG. 2 is a perspective view of a battery block taken out of FIG. 1 and seen from above.
Figure 3:
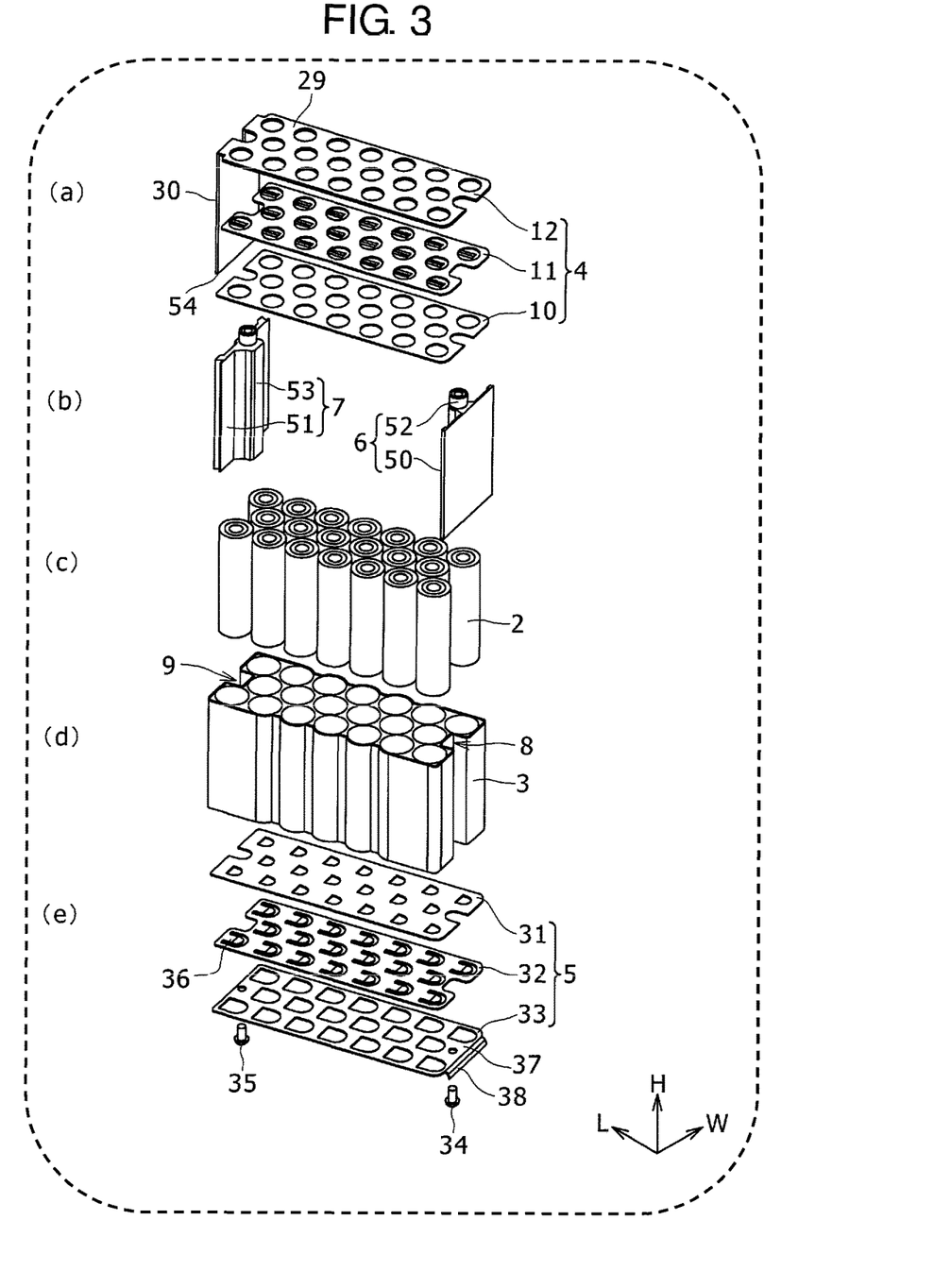
FIG. 3 is an exploded view of the battery block in FIG. 2.

FIG. 1 is a sectional view of battery module 40 in an exemplary embodiment. FIG. 2 is a perspective view of battery block 1 taken out of FIG. 1 and seen from above. FIG. 3 is an exploded view of battery block 1 in FIG. 2. Battery module 40 is used as an electric storage device for an electric device in a vehicle or a building. Battery module 40 may be charged with electric power obtained by a power generation unit such as a solar cell (not shown) and the electric power may be taken out as necessary and supplied to the electric device.

In FIGS. 1 to 3 and part of the drawings described later, height direction H, length direction L, and width direction W are shown as three mutually orthogonal axes. Height direction H shows an up-down direction or a vertical direction when battery module 40 is disposed on a horizontal plane. Length direction L and width direction W show mutually orthogonal directions in the horizontal plane. Here, the direction along a longer side of battery module 40 is set as length direction L, and the direction along a shorter side is set as width direction W.

Battery module 40 includes battery block 1 and duct cover 42 connected to an upper part of battery block 1. As shown in FIG. 2, battery block 1 is formed by connecting a plurality of battery cells 2 in parallel to obtain a predetermined capacity. Here, twenty battery cells 2 are used. In battery block 1, twenty battery cells 2 are held in case 3 while aligned and arranged in a predetermined arrangement relation where positive electrodes are aligned on one side and negative electrodes are aligned on the other side. In this state, positive-side collector 4 is disposed on a positive side and negative-side collector 5 is disposed on a negative side, and positive-side collector 4 and negative-side collector 5 are fastened by appropriate first fastening member 34 and second fastening member 35 with first holder 6 and second holder 7 disposed between positive-side collector 4 and negative-side collector 5.

Battery cells 2 are chargeable/dischargeable secondary batteries. As the secondary batteries, lithium-ion batteries are used. Besides the lithium-ion batteries, nickel-metal-hydride batteries, alkaline batteries, and the like may be used. The section (c) of FIG. 3 shows a perspective view of twenty battery cells 2 stored and arranged in battery block 1. As shown here, twenty battery cells 2 are arranged in a staggered (zigzag) format that minimizes clearances between adjacent batteries. Three rows of battery cells are arranged in direction W, and seven batteries, six batteries, and seven batteries are arranged along direction L in respective battery rows.

Each battery cell 2 has a cylindrical outer shape. One of opposite end parts of the cylindrical shape is used as a positive terminal, and the other is used as a negative terminal. An example of each battery cell 2 is a lithium-ion battery with a diameter of 18 mm, a height of 65 mm, a voltage between the terminals of 3.6 V, and a capacity of 2.5 Ah. These values are examples for description, and other dimensions and characteristic values may be used. Each battery cell 2 is not limited to a cylindrical battery and may be a battery having another outer shape such as a prismatic battery.

Case 3 is a holding vessel for holding twenty battery cells 2 in a state where battery cells 2 are aligned and arranged in a predetermined arrangement relation. The section (d) of FIG. 3 shows a perspective view of case 3. Case 3 is a frame body that has the same height as that of battery cells 2 and includes twenty battery storage parts open on opposite end sides in height direction. Each battery cell 2 is stored and disposed in each battery storage part.

The battery storage parts are arranged in a staggered (zigzag) format in association with the arrangement relation of battery cells 2 shown in the section (c) of FIG. 3. In other words, three rows of battery storage parts are arranged in direction W, and seven battery storage parts, six battery storage parts, and seven battery storage parts are arranged along length direction L in respective rows of battery storage parts. Therefore, a length of the central row of battery storage parts along direction L is shorter than those of rows of battery storage parts on opposite sides along direction L. Thus, first groove 8 and second groove 9 as margin spaces having no battery cells 2 are formed in central parts along direction W at opposite ends of case 3 along direction L. Each of grooves 8, 9 extends from one side to the other side of battery cells 2 along direction H which is a longitudinal direction of battery cells 2 and is recessed toward a part where battery cells 2 are arranged.

As case 3, a case that is made of resin or metal, for example, formed into a predetermined shape may be used.

When twenty battery cells 2 are stored and arranged in the battery storage parts in case 3, the positive electrodes of battery cells 2 are aligned on one side, and the negative electrodes of battery cells 2 are aligned on the other side. In FIG. 2, the one side corresponds to an upside of the sheet surface along direction H, and the other side corresponds to a downside of the sheet surface along direction H.

Positive-side collector 4 is a connection member that is disposed so as to block an opening on the one side of case 3 and electrically connects the positive electrodes of aligned and arranged battery cells 2. The section (a) of FIG. 3 shows positive-side collector 4. As shown here, positive-side collector 4 includes positive-side insulating plate 10, positive electrode collector plate 11, and positive electrode lead plate 12. Each of positive-side insulating plate 10, positive electrode collector plate 11, and positive electrode lead plate 12 includes first cut-away part 13 corresponding to first groove 8 described for case 3 and second cut-away part 14 (FIGS. 6, 7) corresponding to second groove 9 described for case 3.

Positive-side insulating plate 10 is a plate material that is disposed between case 3, and positive electrode collector plate 11 and positive electrode lead plate 12 and electrically insulates case 3 from positive electrode collector plate 11 and positive electrode lead plate 12. Positive-side insulating plate 10 has twenty openings through which the positive electrodes of battery cells 2 protrude. Positive-side insulating plate 10 is formed by a plastic molded article or a plastic sheet (processed into a predetermined shape) having predetermined heat resistance and a predetermined electrical insulating property.

Figure 4:
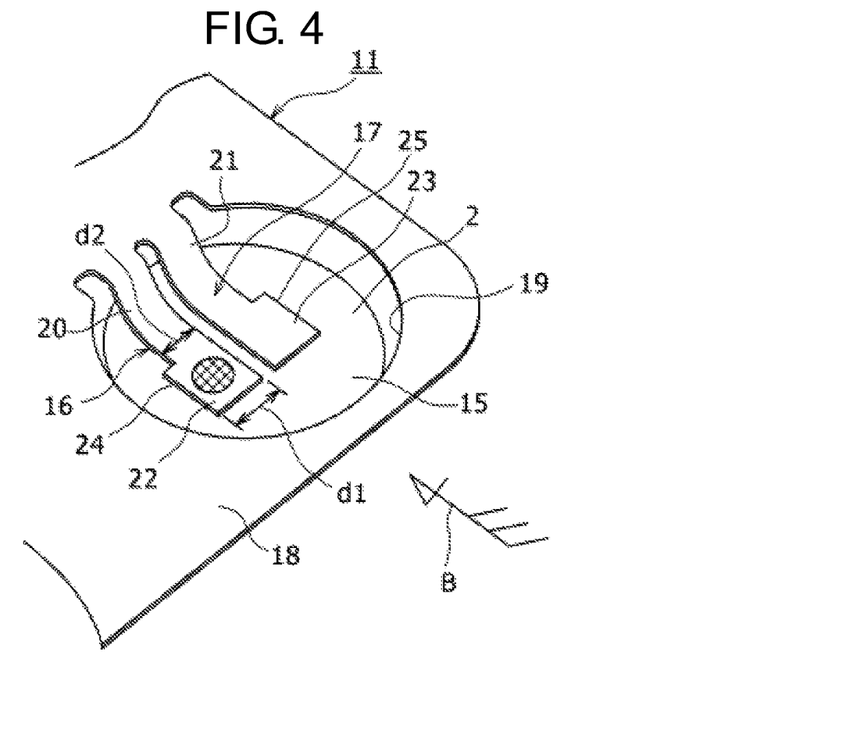
FIG. 4 is an enlarged view of part A in FIG. 2, showing a first connection terminal and a second connection terminal of a positive electrode collector plate.
Figure 5:
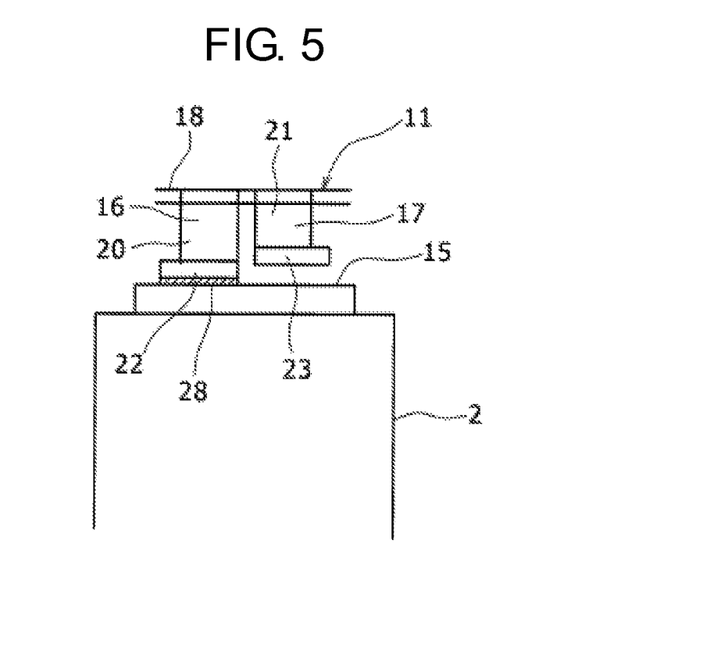
FIG. 5 is a diagram showing a connected state of a connection terminal and a battery cell seen in a direction of arrow B in FIG. 4.

Positive electrode collector plate 11 is disposed on the side of positive electrodes 15 (FIGS. 4, 5) which is the one side of twenty battery cells 2. As shown in FIGS. 4, 5, positive electrode collector plate 11 includes two connection terminals 16, 17 arranged to face an upside of positive electrode 15 of each of battery cells 2.

Figure 6:
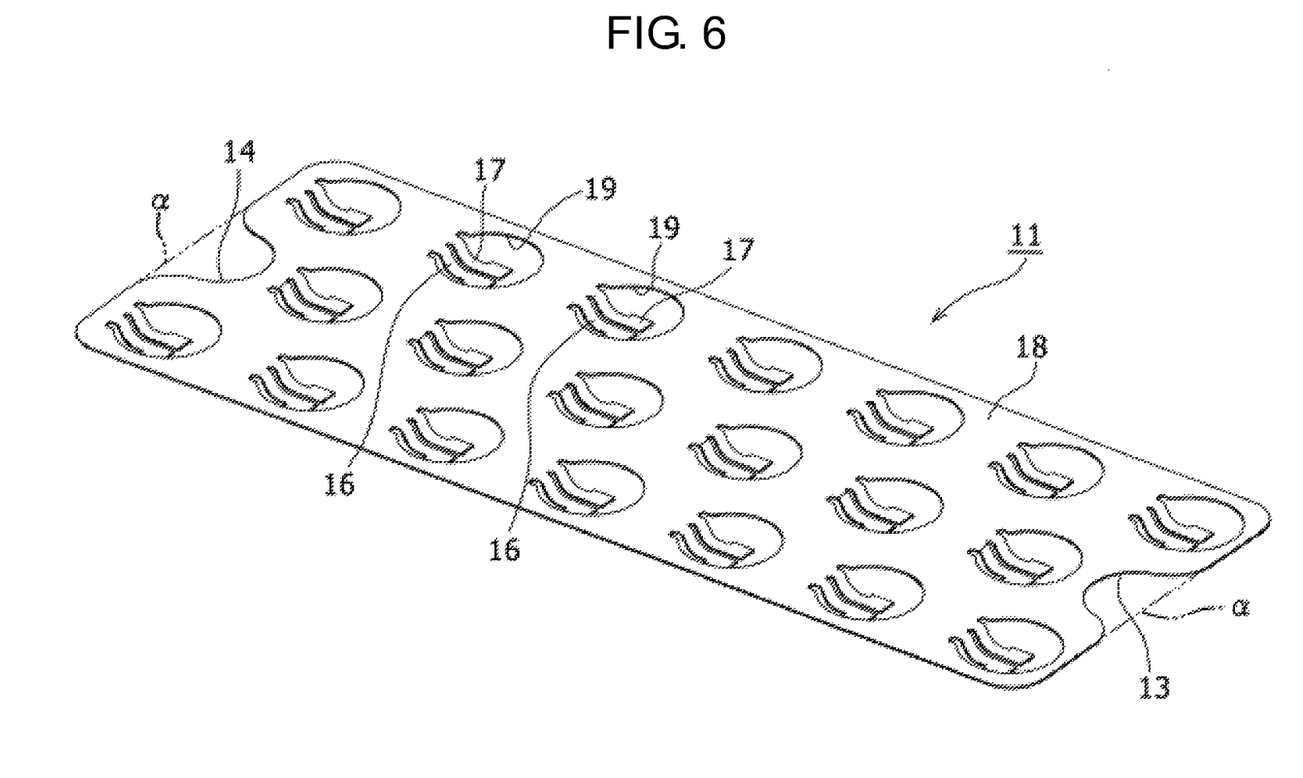
FIG. 6 is a perspective view of the positive electrode collector plate taken out of FIG. 3.
Figure 7:
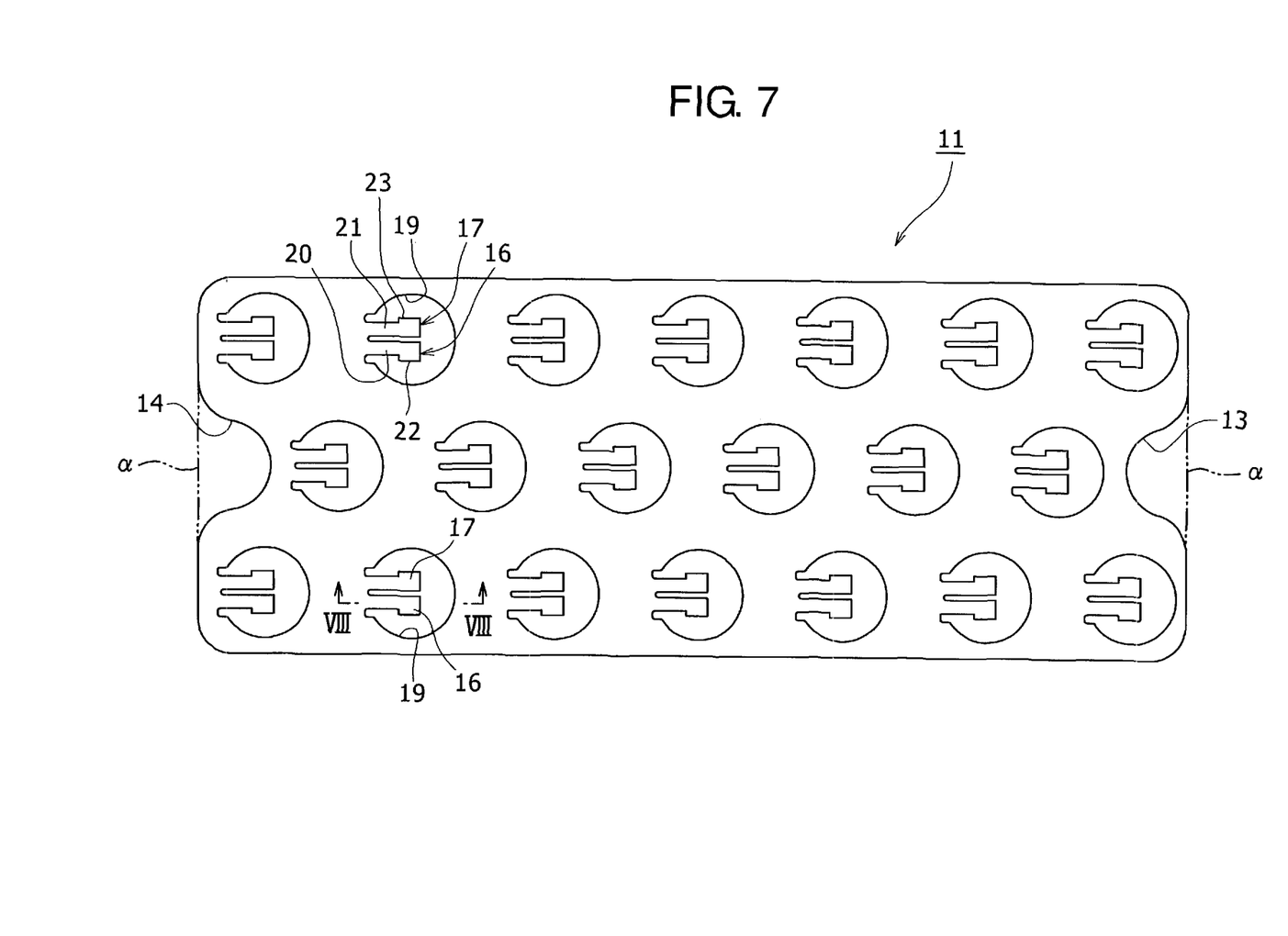
FIG. 7 is a view of the positive electrode collector plate in FIG. 6 seen from above.
Figure 8:
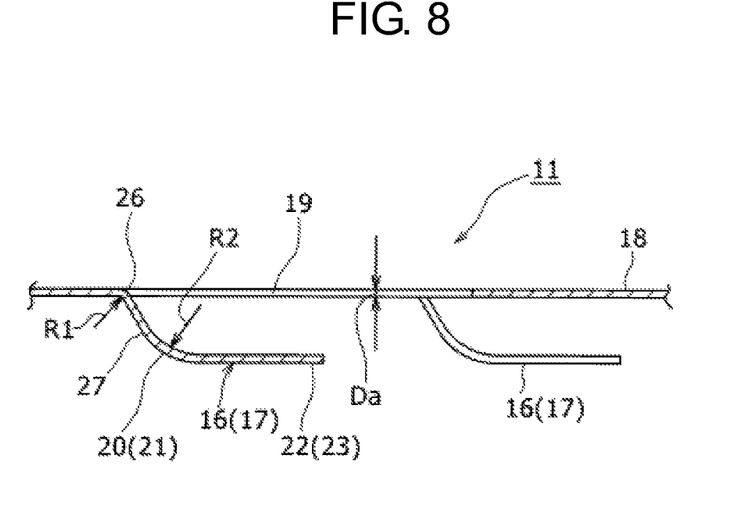
FIG. 8 is a sectional view taken along line VIII-VIII in FIG. 7.

To put it concretely, positive electrode collector plate 11 is formed as shown in FIGS. 6 to 8. FIG. 6 is a perspective view of positive electrode collector plate 11 taken out of FIG. 3. FIG. 7 is a view of positive electrode collector plate 11 in FIG. 6 seen from above. FIG. 8 is a sectional view taken along line VIII-VIII in FIG. 7.

Positive electrode collector plate 11 includes collector plate main body 18 in a shape of a thin plate, circular or rectangular openings 19 provided at twenty positions facing positive electrodes 15 of battery cells 2 (FIGS. 4, 5), and two connection terminals 16, 17 connected to an inner peripheral edge of each of openings 19 to face the upside of positive electrode 15 of each of battery cells 2.

Two connection terminals 16, 17 facing at least one of positive electrodes 15, e.g., each positive electrode 15 in the plurality of positive electrodes 15 are first connection terminal 16 to be welded to positive electrode 15 and a second connection terminal 17 not to be welded to positive electrode 15. Therefore, two connection terminals 16, 17 facing positive electrode 15 include first connection terminal 16 and second connection terminal 17. First connection terminal 16 and second connection terminal 17 are provided side by side in the same direction at an interval to protrude to an inner side of opening 19 formed in collector plate main body 18 from the inner peripheral edge of opening 19 and are bent to one face side (downsides of FIGS. 4, 5) so that tip ends of first connection terminal 16 and second connection terminal 17 approach positive electrode 15. Respective connection terminals 16, 17 are formed integrally with collector plate main body 18, by subjecting a plate material which is to be formed into collector plate main body 18, to pressing (including punching) and bending.

In an example shown in the diagrams, first connection terminal 16 is welded at welded part 28 (FIG. 5) to positive electrode 15 by ultrasonic welding. Each first connection terminal 16 has first arm 20 extending from the inner peripheral edge of opening 19 and bent to curve toward positive electrode 15 and first tip end 22 formed integrally with first arm 20. Each second connection terminal 17 has second arm 21 extending from the inner peripheral edge of opening 19 and bent to curve toward positive electrode 15 and second tip end 23 formed integrally with second arm 21. As shown in FIG. 4, width dimension d1 in a direction orthogonal to an extending direction of each of tip ends 22, 23 is larger than width dimension d2 of each of arms 20, 21. Thus, areas of respective tip ends 22, 23 to be contacted by a transducer of an ultrasonic welder (not shown) can be increased and respective tip ends 22, 23 become more likely to vibrate, which improves weldability. First protrusion 24 in a width direction of first tip end 22 is provided on an opposite outer side of first connection terminal 16 from second connection terminal 17. Second protrusion 25 in a width direction of second tip end 23 is provided on an opposite outer side of second connection terminal 17 from first connection terminal 16. In this way, it is possible to prevent a diameter of opening 19 where two connection terminals 16, 17 are formed from becoming excessively large.

As shown in FIG. 8, a base end of each of first connection terminal 16 and second connection terminal 17 is connected at curved face part 26 having an arc-shaped cross section with curvature radius R1 to the inner peripheral edge of opening 19. At a middle part of each of arms 20, 21, second curved face part 27 having an arc-shaped cross section with curvature radius R2 is formed. Each of curvature radiuses R1, R2 is preferably larger than or equal to plate thickness Da of positive electrode collector plate 11 and more preferably twice as large as or larger than twice plate thickness Da. In this way, it is possible to prevent occurrence of excessively large stress concentration on base of each of connection terminals 16, 17 during a welding operation, which improves durability of parts and prevents reduction in a yield rate of a product.

Both of tip ends 22, 23 of first connection terminal 16 and second connection terminal 17 of positive electrode collector plate 11 are disposed in the same plane parallel to collector plate main body 18 before tip ends 22, 23 are welded to positive electrode 15 (FIGS. 4, 5). Tip end 22 of at least one first connection terminal 16 in first connection terminals 16 and second connection terminals 17 is welded to positive electrode 15. FIG. 4 shows that first connection terminal 16 is welded at a back side of a diagonally hatched encircled part to positive electrode 15.

Returning to the section (a) of FIG. 3, positive electrode lead plate 12 is an electrode plate that is electrically connected to positive electrode collector plate 11 and is used for forming one positive-side output terminal by connecting respective connection terminals 16, 17 to each other. Positive electrode lead plate 12 is a bent plate and includes plane part 29 facing positive electrode collector plate 11 and side face part 30 that is bent from an end of plane part 29 in direction L toward negative-side collector 5 along direction H. Bending of positive electrode lead plate 12 from plane part 29 to side face part 30 is performed at the end in direction L and on a side of holder 7, namely on a left side on the sheet surface of the section (a) of FIG. 3. Plane part 29 has twenty openings so that respective connection terminals 16, 17 of positive electrode collector plate 11 can be deformed elastically.

As positive electrode lead plate 12, a metal thin plate having electric conductivity and appropriate thickness and strength can be used.

Negative-side collector 5 is a connection member that is disposed so as to block the opening on the other side of case 3 and electrically connects the negative electrodes of aligned and arranged battery cells 2. The section (e) of FIG. 3 shows negative-side collector 5. As shown here, negative-side collector 5 includes negative-side insulating plate 31, negative electrode collector plate 32, and negative electrode lead plate 33. Each of negative-side insulating plate 31 and negative electrode collector plate 32 has cut-away parts corresponding to grooves 8, 9 described for case 3. Negative electrode lead plate 33 has screw holes for fastening members 34, 35 at positions corresponding to grooves 8, 9.

Negative-side insulating plate 31 is a plate material that is disposed between case 3, and negative electrode collector plate 32 and negative electrode lead plate 33 and electrically insulates case 3 from negative electrode collector plate 32 and negative electrode lead plate 33. Negative-side insulating plate 31 has twenty openings through which the negative electrodes of battery cells 2 are exposed. Negative-side insulating plate 31 is formed by a plastic molded article or a plastic sheet (processed into a predetermined shape) having predetermined heat resistance and a predetermined electrical insulating property.

Negative electrode collector plate 32 is a thin plate disposed on the side of negative electrodes which is the other side of twenty battery cells 2 and including twenty negative electrode connection terminals 36 arranged in a positional relation in which each negative electrode connection terminal 36 elastically comes into contact with the negative electrode of each battery cell 2. Negative electrode collector plate 32 can be formed by processing a metal thin plate having electric conductivity. Respective negative electrode connection terminals 36 are formed into predetermined shapes by etching or pressing the metal thin plate.

Negative electrode lead plate 33 is an electrode plate that is electrically connected to negative electrode collector plate 32 and is used for forming one negative-side output terminal by connecting twenty negative electrode connection terminals 36 to each other. Negative electrode lead plate 33 includes lead plane part 37 and negative electrode lead tip end 38 bent from an end in direction L of lead plane part 37 toward a downside on the sheet surface of FIG. 3 along direction H. As a variation, negative electrode lead plate 33 may be in the same shape as positive electrode lead plate 12. In this variation, negative electrode lead plate 33 includes a bent plate formed by a lead plane part facing negative electrode collector plate 32 and a lead side face part that is bent from an end of the lead plane part in direction L toward positive-side collector 4 along direction H. Bending of negative electrode lead plate 33 from the lead plane part to the lead side face part is performed at the end in direction L and on a side of holder 6, namely on a right side on the sheet surface of FIG. 3.

First holder 6 and second holder 7 are members for fastening, using the fastening members, positive-side collector 4 disposed on one side of case 3 and negative-side collector 5 disposed on the other side, thereby integrating case 3, positive-side collector 4, and negative-side collector 5 as a whole. First holder 6 and second holder 7 are made of insulating material. The section (b) of FIG. 3 shows holders 6, 7. In this structure, at opposite ends of case 3 in length direction L, first holder 6 is disposed on the right of the sheet surface and second holder 7 is disposed on the left of the sheet surface.

As shown in the section (b) of FIG. 3, holders 6, 7 are disposed so as to abut respective grooves 8, 9 in opposed faces of an outer shape of case 3, respectively. Grooves 8, 9 are abutted parts which holders 6, 7 abut. First holder 6 includes first wall 50 for abutting a side face of case 3 and first shaft 52 to be fitted into first groove 8 of case 3. Second holder 7 includes second wall 51 for abutting a side face of case 3 and second shaft 53 to be fitted into second groove 9 of case 3. An end of each of first shaft 52 and second shaft 53 includes a thread part for each of the fastening members. Holders 6, 7 can be formed by processing an insulating plate material into a predetermined shape. Holders 6, 7 do not need to be formed separately. For example, a side part for covering a side face of case 3 may be integrated with an upper part for covering a positive electrode side or a lower part for covering a negative electrode side.

First fastening member 34 is a screw for fixing negative-side collector 5 to first holder 6 by using the thread part provided to first shaft 52 of first holder 6. Second fastening member 35 is a screw for fixing negative-side collector 5 to second holder 7 by using the thread part provided to second shaft 53 of second holder 7. Similarly, positive-side collector 4 is fixed to holders 6, 7 by using other fastening members (not shown).

Thus, in battery block 1, battery cells 2 are stored in the case having the twenty battery storage parts. At this time, the positive electrodes of battery cells 2 are aligned on the one side, the negative electrodes are aligned on the other side, positive-side collector 4 is disposed on the positive side, negative-side collector 5 is disposed on the negative side, and the case, positive-side collector 4, and negative-side collector 5 are integrated with holders 6, 7 interposed between the case, and positive-side collector 4 and negative-side collector 5 by using appropriate fastening members 34, 35, and the like.

Returning to FIG. 1, safety valve 45 is provided on the positive side of each battery cell 2. To put it concretely, safety valve 45 which is a metal sheet is provided on an inner side of positive electrode 15 and a pressure of gas generated by electrochemical reactions occurring in battery cell 2 acts on safety valve 45. When the gas pressure exceeds a predetermined threshold pressure, safety valve 45 ruptures and the gas is released outside battery cell 2 through an opening (not shown) provided to positive electrode 15. Safety valve 45 is provided to each of twenty battery cells 2.

Duct cover 42 is a part which covers a positive-side end of battery block 1 and is hermetically joined to side faces of case 3 of battery block 1 extending in direction L to form, inside duct cover 42, duct chamber 41 for allowing the gas to flow to a side of the positive-side end of battery block 1. Duct cover 42 is fixed to battery block 1 by use of shafts 52, 53 of holders 6, 7 of battery block 1 and by fastening members 34, 35.

Both of first shaft 52 and second shaft 53 are insulating bodies. Duct cover 42 is fixed to positive sides of first shaft 52 and second shaft 53 by two fastening members (not shown) and negative-side collector 5 is fixed to negative sides of first shaft 52 and second shaft 53 by fastening members 34, 35.

Exhaust gas from safety valve 45 is discharged into duct chamber 41 inside duct cover 42. The exhaust gas discharged into duct chamber 41 is discharged outside battery module 40 through an exhaust hole (not shown) provided to one end or each end of duct cover 42 in length direction L. Positive electrode lead tip end 54 of positive electrode lead plate 12 and negative electrode lead tip end 38 of negative electrode lead plate 33 respectively serve as positive electrode and negative electrode terminals.

Although safety valve 45 is provided to the positive side of battery cell 2, safety valve 45 may be provided to the negative side of battery cell 2. If safety valve 45 is provided to the negative side, duct cover 42 and duct chamber 41 are provided to the negative side of battery cell 2.

Figure 9:
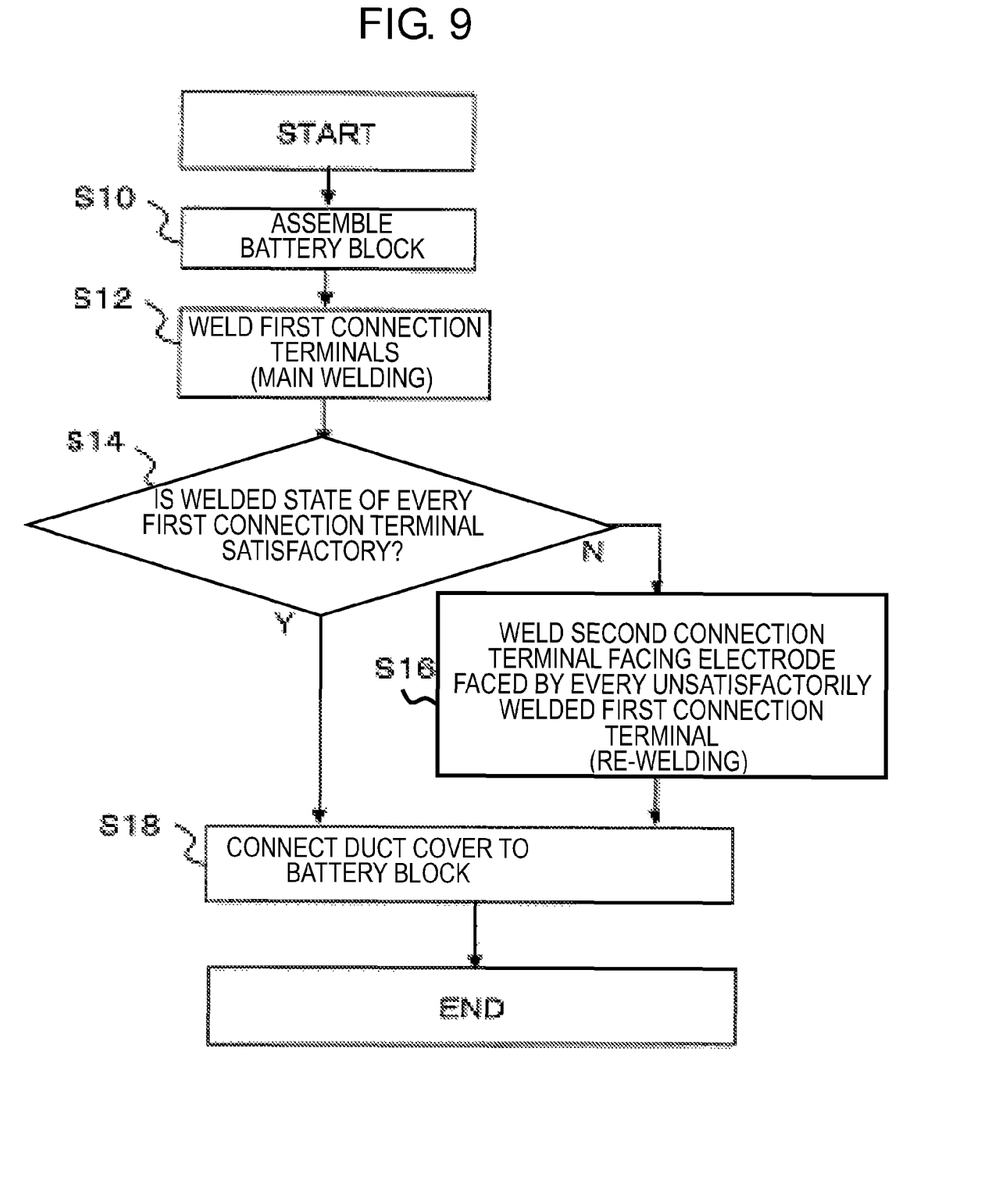
FIG. 9 is a flowchart showing a method of manufacturing the battery module in FIG. 1.

A method of manufacturing battery module 40 including this battery block 1 is carried out as shown in FIG. 9. FIG. 9 is a flowchart showing the method of manufacturing battery module 40 in FIG. 1. The method of manufacturing battery module 40 includes a main welding step and a re-welding step described below.

To put it concretely, in the method of manufacturing battery module 40, as shown in step S10 (hereinafter step S is simply referred to as "S") in FIG. 9, an operator or a manufacturing device carries out an assembly operation for integrally assembling component parts of battery block 1 excluding duct cover 42. In this assembly operation, welding between the negative electrodes of the plurality of battery cells 2 and connection terminals 36 of negative electrode collector plate 32 is also carried out.

In the main welding step in S12, a welding operation for ultrasonically welding only first connection terminal 16 in the plurality of connection terminals 16, 17 facing each positive electrode 15 to positive electrode 15 is carried out. In this case, the transducer of the ultrasonic welder is ultrasonically vibrated in a horizontal direction while the transducer is pressed against first tip end 22 of first connection terminal 16 and positive electrode 15 is pressed by first tip end 22. In the main welding step, second connection terminal 17 is not welded to positive electrode 15.

After S12 is carried out, in S14, whether states of welding between all of first connection terminals 16 and positive electrodes 15 are satisfactory is determined by the operator or the manufacturing device. If a result of the determination in S14 is affirmative, duct cover 42 is connected to battery block 1 in S18 so that battery module 40 is formed.

On the other hand, if at least one of the state of the welding, i.e., the welded state of only one of first connection terminals 16 is determined to be unsatisfactory in S14, a re-welding operation is carried out by ultrasonically welding second connection terminal 17 facing same electrode 15 as every unsatisfactorily welded first connection terminal 16 faces, to positive electrode 15 (S16). The unsatisfactorily welded states include both of a half-welded state in which first connection terminal 16 and positive electrode 15 are not welded satisfactorily and a state in which first connection terminal 16 and positive electrode 15 are not welded. For example, in carrying out the ultrasonic welding, if one first connection terminal 16 and positive electrode 15 are welded in a half-welded state, this first connection terminal 16 cannot be vibrated by the transducer and therefore the re-welding by using this first connection terminal 16 cannot be carried out. In this case, because second connection terminal 17 is not welded to positive electrode 15, the re-welding can be carried out by using second connection terminal 17.

If the satisfactorily welded states between any one of first connection terminals 16 and second connection terminals 17 facing all of positive electrodes 15, and positive electrodes 15 are confirmed, the process goes to S18 described above.

In battery module 40 described above, connection terminals 16, 17 facing at least one of positive electrodes 15 include first connection terminal 16 to be welded to positive electrode 15 and second connection terminal 17 not to be welded to positive electrode 15. The method of manufacturing battery module 40 includes the main welding step for welding only first connection terminal 16 out of first connection terminal 16 and second connection terminal 17 facing each positive electrode 15 to positive electrode 15. Therefore, even if a welding failure occurs between first connection terminal 16 and positive electrode 15, there is a chance of re-welding for welding second connection terminal 17 and positive electrode 15. As a result, it is possible to suppress reduction in the yield rate of the product, even when the welding failures between positive electrodes 15 and first connection terminals 16 occur.

Although the ultrasonic welding between positive electrodes 15 and connection terminals 16 (or 17) has been described above, resistance welding or laser welding may be employed as the welding. For example, when a welding failure occurs in the resistance welding, re-welding cannot be carried out in some cases, because it is impossible to impart desired resistance to a part to be re-welded. When a welding failure occurs in the laser welding, first connection terminal 16 is distant from positive electrode 15 with a gap between first connection terminal 16 and positive electrode 15 and, as a result, it is impossible to carry out re-welding by using this first connection terminal 16. In these cases, satisfactory welding to positive electrode 15 is possible by re-welding using second connection terminal 17. Positive electrode collector plate 11 is not limited to the structure in which first connection terminals 16, second connection terminals 17, and collector plate main body 18 are molded integrally. A positive electrode collector plate may be formed by connecting a positive electrode collector plate main body (not shown) and connection terminals (not shown) which are separate members from the positive electrode collector plate main body. The same is true of negative electrode collector plate 32, as well.

Although first cut-away part 13 and second cut-away part 14 for positioning are formed at opposite ends in the length direction of positive electrode collector plate 11 in the above description, cut-away parts may not be formed at opposite ends in a length direction of collector plate 11 as shown by two-dot chain lines a in FIGS. 6, 7.

Figure 10:
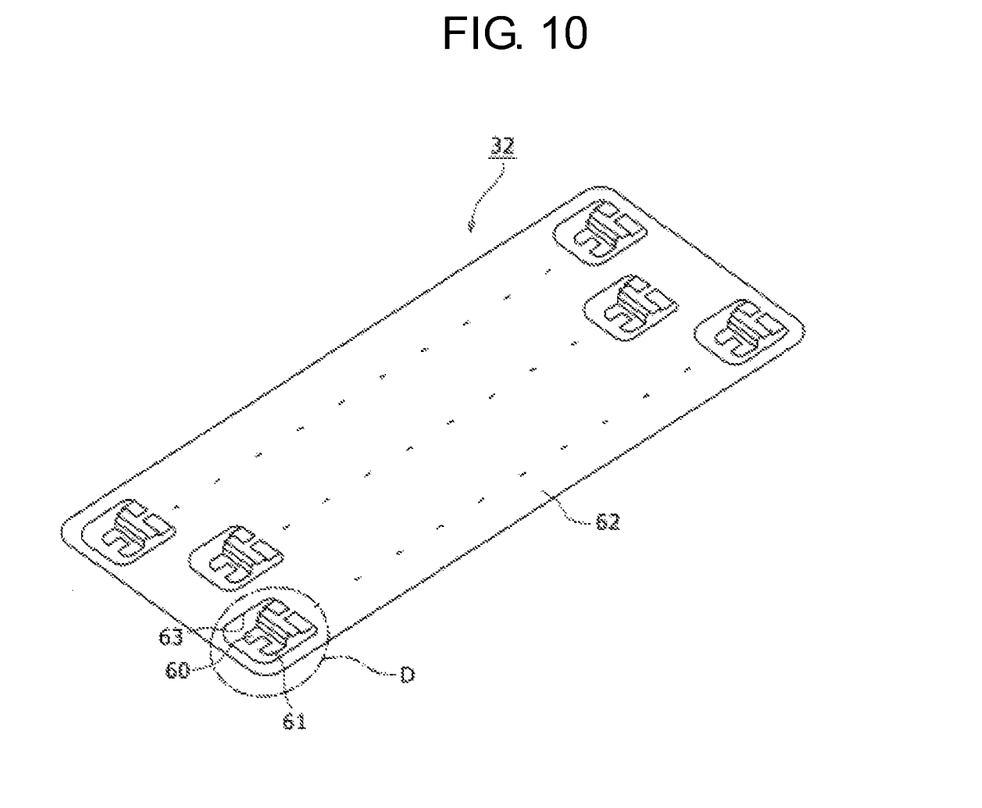
FIG. 10 is a perspective view of a negative electrode collector plate forming a variation of the battery module in the exemplary embodiment of the present disclosure.
Figure 11:
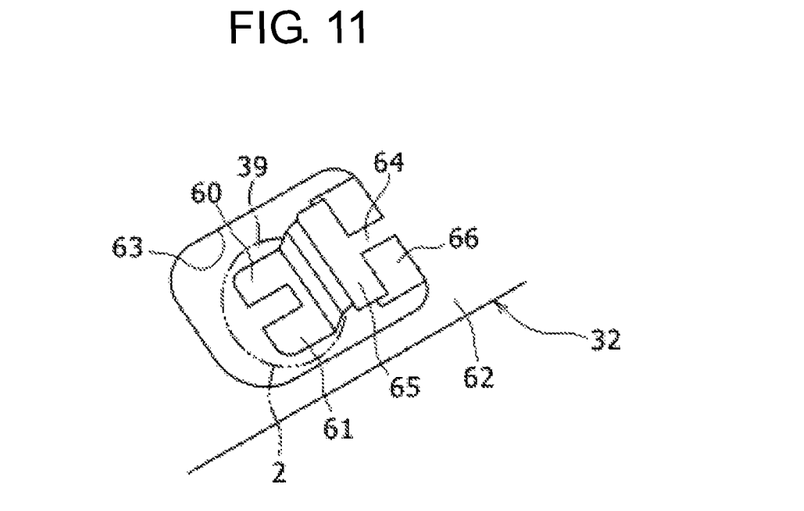
FIG. 11 is an enlarged view of part D in FIG. 10 seen from above.

FIG. 10 is a perspective view of negative electrode collector plate 32 forming a variation of the battery module in the exemplary embodiment. FIG. 11 is an enlarged view of part D in FIG. 10 seen from above. In a structure in the present variation, two connection terminals 60, 61 provided to negative electrode collector plate 32 are disposed to face negative electrode 39 of each of a plurality of battery cells 2. To put it concretely, negative electrode collector plate 32 includes collector plate main body 62 in a shape of a thin plate, rectangular or circular openings 63 provided at twenty positions of collector plate main body 62 facing negative electrodes 39 of respective battery cells 2, a straight fuse part 64 connected to an inner peripheral edge of each of openings 63, and battery-side disposed part 65 connected to an opposite end of fuse part 64 from a side connected to opening 63. Battery-side disposed part 65 is bent so that a tip end side of battery-side disposed part 65 approaches negative electrode 39 of battery cell 2. Two connection terminals 60, 61 branch off and project parallel from the tip end of battery-side disposed part 65 with a clearance between connection terminals 60, 61.

Collector plate main body 62, fuse part 64, and battery-side disposed part 65 are integrally formed by subjecting a metal plate to pressing (including punching) and bending. Connection terminals 60, 61 are disposed to face negative electrode 39, respectively.

Reinforcing sheet 66 for reinforcing a lower side of a junction between collector plate main body 62 and battery-side disposed part 65 as well as fuse part 64 is secured to a lower side of fuse part 64. Reinforcing sheet 66 is made of insulating material such as resin.

Although such negative electrode collector plate 32 does not have cut-away parts for positioning at opposite ends in length direction, the cut-away parts for positioning may be formed.

Two connection terminals 60, 61 facing at least one negative electrode 39 out of the plurality of negative electrodes 39, e.g., each negative electrode 39 are first connection terminal 60 to be welded to negative electrode 39 and second connection terminal 61 not to be welded to negative electrode 39. Therefore, two connection terminals 60, 61 facing negative electrode 39 include first connection terminal 60 and second connection terminal 61.

In a welding operation of negative electrode collector plate 32 and negative electrode 39, a welding operation in which only first connection terminal 60 out of the plurality of connection terminals 60, 61 facing each negative electrode 39 is welded to negative electrode 39 is carried out. In a main welding step, second connection terminal 61 is not welded to negative electrode 39.

After the main welding step is carried out, whether states of welding between all of first connection terminals 60 and negative electrodes 39 are satisfactory is determined. If a result of the determination is affirmative, welding between positive electrode collector plate 11 and respective positive electrodes 15 is carried out similarly to the structure in FIGS. 1 to 9.

On the other hand, if at least one of the states of the welding, e.g., the welded state of at least one of first connection terminals 60 is determined to be unsatisfactory, a re-welding operation is carried out by welding second connection terminal 61 facing same negative electrode 39 as every unsatisfactorily welded first connection terminal 60 faces, to negative electrode 39 as a re-welding step.

With the above-described structure, it is possible to suppress reduction in a yield rate of a product, even when the welding failures between negative electrodes 39 and connection terminals 60 occur. Moreover, because fuse part 64 is provided between collector plate main body 62 and connection terminals 60, 61, fuse part 64 melts when an excessive current flows from one battery cell 2 to fuse part 64 to thereby prevent the excessive current from affecting other battery cells 2. Other structures and operations are similar to those of the structure in FIGS. 1 to 9.

In the structure in FIGS. 10, 11, fuse part 64 is not limited to a structure formed in a straight shape and fuses in various shapes may be used. In the structure using negative electrode collector plate 32 in FIGS. 10, 11, positive electrode collector plate 11 may be formed so that only one connection terminal (not shown) is disposed to face each of positive electrodes 15.

In the structure in each of the above-described examples, positive electrode collector plate 11 or negative electrode collector plate 32 in which connection terminals 16, 17 (or 36, or 60, 61) in predetermined shapes are formed at a plane part by etching or pressing and side face part 30 or negative electrode lead tip end 38 is formed to be perpendicular to the plane part by bending may be used. In this case, because positive electrode collector plate 11 or negative electrode collector plate 32 has a function of positive electrode lead plate 12 or negative electrode lead plate 33, it is possible to reduce a number of parts.

Although the exemplary embodiment of the present disclosure has been described above, the present disclosure is not limited to the exemplary embodiment and it is needless to say that the present disclosure can be carried out in various embodiments without departing from the gist of the present disclosure. For example, in each example, three or more connection terminals 16, 17 (or 60, 61) may be provided as connection terminals facing each positive electrode 15 or each negative electrode 39 in each of collector plates 11, 32.

Although all of battery cells 2 are connected in parallel in the above description, the present disclosure may be applied to a structure in which a plurality of groups of battery cells connected in parallel are connected in series. Moreover, a battery module may be formed by connecting a plurality of battery blocks in series by arranging battery blocks 1 along length direction L, connecting negative electrode lead tip end 38 of the other battery block to positive electrode lead tip end 54 of one battery block by welding or the like, and repeating this process between the adjacent battery blocks.

A battery module may include a circuit board having a function of controlling output from or input to battery cells 2, and the like.

The invention claimed is:

1. A battery module comprising: a plurality of battery cells held in a case; and
   a collector plate disposed on one side or an other side of the plurality of battery cells, wherein the collector plate includes a plurality of connection terminals connected to a collector plate main body so that the plurality of the connection terminals are disposed to face an electrode provided in each of the battery cells,
   in at least one of the electrodes, the plurality of the connection terminals facing the at least one electrode include a first connection terminal welded to the at least one electrode and a second connection terminal spaced from and not welded to the at least one electrode, and
   the first connection terminal and the second connection terminal are arranged side by side at an interval to protrude from an inner peripheral edge of an opening formed in the collector plate main body and are bent to approach the electrode.

2. The battery module according to claim 1, wherein a base end of each of the first connection terminal and the second connection terminal is connected to the inner peripheral edge of the opening via a curved face part having an arc-shaped cross section.

3. The battery module according to claim 1,
   wherein the collector plate includes:
   a fuse part connected to an inner peripheral edge of an opening formed in the collector plate main body; and
   a battery-side disposed part connected to an opposite end of the fuse part from an end of the fuse part connected to the opening, and
   the first connection terminal and the second connection terminal branch off from a tip end of the battery-side disposed part.

4. The battery module according to claim 1, wherein each of the first connection terminal and the second connection terminal has an arm and a tip thereof, and width dimension in a direction orthogonal to an extending direction of the tip end is larger than width dimension of the arm.

\* \* \* \* \*